United States Patent
Jeong et al.

(10) Patent No.: US 9,643,858 B2
(45) Date of Patent: May 9, 2017

(54) METHOD FOR MANUFACTURING CARBONATE

(71) Applicant: Nanotech Ceramics Co., Ltd., Busan (KR)

(72) Inventors: Sang-Ok Jeong, Pusan (KR); Yan Wook Kim, Chang-won (KR); Hak Woo Lee, Pusan (KR)

(73) Assignee: NANOTECH CERAMICS CO., LTD., Busan (KR)

( * ) Notice: Subject to any disclaimer, the term of this patent is extended or adjusted under 35 U.S.C. 154(b) by 70 days.

(21) Appl. No.: 14/596,265

(22) Filed: Jan. 14, 2015

(65) Prior Publication Data

US 2016/0016809 A1  Jan. 21, 2016

(30) Foreign Application Priority Data

Jul. 18, 2014  (KR) .................. 10-2014-0091095

(51) Int. Cl.

| | |
|---|---|
| *C01F 11/18* | (2006.01) |
| *C01D 7/07* | (2006.01) |
| *C01F 5/24* | (2006.01) |
| *C01F 5/22* | (2006.01) |
| *C01F 11/02* | (2006.01) |

(52) U.S. Cl.
CPC ............ *C01F 11/18* (2013.01); *C01F 5/22* (2013.01); *C01F 5/24* (2013.01); *C01F 11/02* (2013.01); *C01P 2002/72* (2013.01); *C01P 2002/85* (2013.01); *C01P 2004/03* (2013.01); *C01P 2006/80* (2013.01)

(58) Field of Classification Search
CPC ... C01D 7/07; C01F 5/22; C01F 11/18; C01F 11/181; Y02C 10/06

See application file for complete search history.

(56) References Cited

U.S. PATENT DOCUMENTS

| | | | | |
|---|---|---|---|---|
| 3,676,067 | A * | 7/1972 | Tabata ..................... | C01F 5/22 203/7 |
| 2005/0129606 | A1* | 6/2005 | Mitsuhashi ............ | A01N 25/08 423/430 |
| 2007/0217981 | A1* | 9/2007 | Van Essendelft .. | B01D 53/1475 423/220 |
| 2008/0031801 | A1* | 2/2008 | Lackner ................. | B01D 53/62 423/438 |
| 2009/0001020 | A1* | 1/2009 | Constantz ............ | B01D 61/025 210/652 |
| 2010/0084283 | A1* | 4/2010 | Gomez ................ | B01D 53/864 205/742 |

(Continued)

FOREIGN PATENT DOCUMENTS

| | | |
|---|---|---|
| KR | 20090006934 A | 1/2009 |
| KR | 20100079827 A | 7/2010 |

*Primary Examiner* — Steven A. Friday
(74) *Attorney, Agent, or Firm* — Madeline F. Schiesser; Keohane & D'Alessandro PLLC

(57) ABSTRACT

Methods are disclosed for manufacturing magnesium carbonate and calcium carbonate, specifically manufacturing refined carbonates such as magnesium carbonate ($MgCO_3$) and calcium carbonate ($CaCO_3$) through processes including electrolysis, carbon dioxide injection, and calcium oxide (CaO) or calcium hydroxide ($Ca(OH)_2$) injection in seawater.

20 Claims, 13 Drawing Sheets

(56) References Cited

U.S. PATENT DOCUMENTS

2011/0030586 A1\* 2/2011 Constantz .............. C04B 7/364
　　　　　　　　　　　　　　　　　　　　　　　　106/640
2011/0195017 A1\* 8/2011 Martinez Martinez ... C01F 5/22
　　　　　　　　　　　　　　　　　　　　　　　　423/637

\* cited by examiner

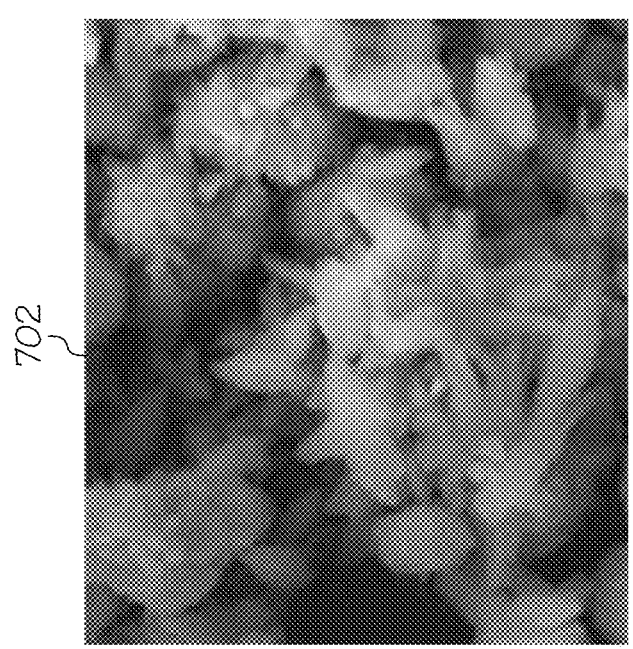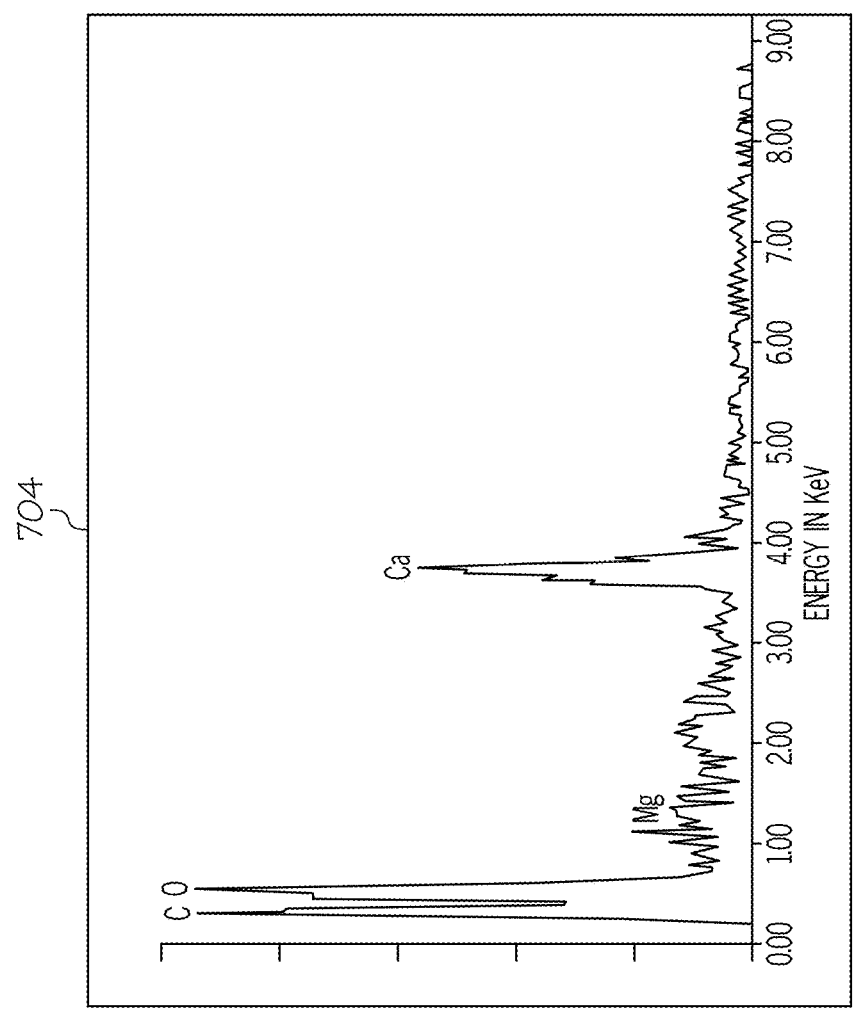
FIG. 7

IDENTIFIED PATTERNS LIST: 820

| VISIBLE | REF. CODE | SCORE | COMPOUND NAME | DISPLACEMENET [°2TH] | SCALE FACTOR | CHEMICAL FORMULA |
|---|---|---|---|---|---|---|
| * | 00-041-1475 | 77 | ARAGONITE | 0.033 | 0.382 | $CaCO_3$ |
| * | 01-071-1663 | 66 | CALCITE, MAGNESIAN | -0.109 | 0.949 | $Mg_{0.1}Ca_{0.9}O_3$ |

PLOT OF IDENTIFIED PHASES:

IDENTIFIED PATTERNS LIST:

| VISIBLE | REF. CODE | SCORE | COMPOUND NAME | DISPLACEMENET [°2TH] | SCALE FACTOR | CHEMICAL FORMULA |
|---|---|---|---|---|---|---|
| * | 00-044-1482 | 77 | BRUCITE, SYN | 0.000 | 1.009 | $Mg(OH)_2$ |
| * | 01-070-1177 | 22 | MAGNESIUM TETRAKIS(CARBONATE) DIHYDROXIDE TETRAHYDRATE | 0.000 | 0.154 | $Mg_5(CO_3)_4(OH)_2 \cdot 4H_2O$ |
| * | 00-015-1045 | 40 | 3GB-HYDROXY-DINOR-5-CHOLENIC ACID | 0.000 | 0.100 | $C_{22}H_{34}O_3$ |

PLOT OF IDENTIFIED PHASES:

IDENTIFIED PATTERNS LIST:

| VISIBLE | REF. CODE | SCORE | COMPOUND NAME | DISPLACEMENET [°2TH] | SCALE FACTOR | CHEMICAL FORMULA |
|---|---|---|---|---|---|---|
| * | 01-070-1177 | 66 | MAGNESIUM TETRAKIS(CARBONATE) DIHYDROXIDE TETRAHYDRATE | 0.000 | 2.033 | $Mg_5(CO_3)_4(OH)_2 \cdot 4H_2O$ |

PLOT OF IDENTIFIED PHASES:

IDENTIFIED PATTERNS LIST: 1220

| VISIBLE | REF. CODE | SCORE | COMPOUND NAME | DISPLACEMENET [°2TH] | SCALE FACTOR | CHEMICAL FORMULA |
|---|---|---|---|---|---|---|
| * | 00-019-1130 | 62 | SODIUM CORBONITE | 0.000 | 0.831 | $Na_2CO_3$ |
| * | 00-008-0448 | 54 | THERMONATRITE, SYN | 0.000 | 0.769 | $Na_2CO_3 \cdot H_2O$ |
| * | 01-077-2082 | 63 | SODIUM CORBONATE-GAMMA | 0.000 | 0.859 | $Na_2CO_3$ |
| * | 01-078-1064 | 47 | TRISODIUM HYDROGEN DICARBONATE DIHYDRATE | 0.000 | 0.776 | $Na_3H(CO_3)_2 \cdot H_2O$ |
| * | 01-086-0299 | 31 | SODIUM CARBONATE-BETA | 0.000 | 0.279 | $Na_2CO_3$ |
| * | 01-086-0296 | 30 | SODIUM CARBONATE-BETA | 0.000 | 0.245 | $Na_2CO_3$ |

PLOT OF IDENTIFIED PHASES: 1222

METHOD FOR MANUFACTURING CARBONATE

FIELD OF THE INVENTION

The present invention relates generally to methods for manufacturing carbonate, and more particularly to methods of manufacturing carbonate utilizing sea water.

BACKGROUND

In an atmospheric environment, various chemical substances exist, and under normal environment and concentrations, these substances do not pose threats to an environmental ecosystem. However, with industrialization advancing at the current pace, various industrial machines and means of transport emit excessive amounts of chemical substances which result in rapid atmospheric pollution.

Chemical substances causing pollution have both direct and indirect impact on humans and environment altogether. Directly, they can cause damage to health of life forms including humans and animals, as well as plants. Indirectly, they contribute significantly to various environmental issues such as acidic rain and global warming.

"Green-house gases" contributing to global warming generally include carbon dioxide ($CO_2$), methane ($CH_4$), as well as nitrogen dioxide ($NO_2$), and these so-called "green-house gases" are referred to as atmospheric gases contributing to the increase in the earth's temperature, which is the major environmental issue that we face. Among these gases, carbon dioxide ($CO_2$) is the primary contributor to global warming. As such, the most challenging task that climate experts face these days is how to reduce the amount of carbon dioxide ($CO_2$) present in the atmosphere. There have been many active efforts from different countries in the world to reduce carbon dioxide ($CO_2$).

Calcium carbonate is widely used in rubber, paper, plastic, adhesives, pigments, varnish, cosmetics, films, semiconductors, foods, and drugs, whereas magnesium carbonate is widely used in rubber, paint, drugs, cables, insulators, plastic, paper, and so on. However, when carbonate is produced in a manner that lacks purity, it cannot be used as base material for the aforementioned products and therefore needs to be disposed.

SUMMARY

Embodiments of the present invention address problems associated with prior art methods by enabling methods of successive manufacturing of magnesium carbonate ($MgCO_3$), calcium carbonate ($CaCO_3$), and sodium carbonate ($Na_2CO_3$) refined enough for utilization, and, at the same time, capturing a considerable amount of carbon dioxide to contribute in reduction of carbon dioxide emissions.

Embodiments for manufacturing carbonate may comprise the following steps (the steps are denoted with 'S' followed by a number): S1: manufacturing magnesium hydroxide ($Mg(OH)_2$) by adding calcium oxide (CaO) or calcium hydroxide ($Ca(OH)_2$) in seawater solution; S2: getting rid of supernatant in such seawater solution and separating the lower portion liquid where magnesium hydroxide ($Mg(OH)_2$) is contained; S3: adding carbon dioxide ($CO_2$) in such lower portion liquid where magnesium hydroxide ($Mg(OH)_2$) is contained to produce magnesium carbonate ($MgCO_3$); S4 electrolyzing sodium chloride (NaCl) contained in supernatant disposed in S2 to produce sodium hydroxide (NaOH) as well as hydrogen chloride (HCl); S5 adding sodium hydroxide (NaOH) obtained from S4 in disposed supernatant from S2 to produce calcium hydroxide ($Ca(OH)_2$); S6 disposing supernatant from S5 and separating lower portion liquid including calcium hydroxide ($Ca(OH)_2$); and S7: adding carbon dioxide ($CO_2$) in such lower portion liquid in S6 to produce calcium carbonate ($CaCO_3$). In an alternative embodiment, for step S5, a $CaCl_2$ (aq) solution is added to the supernatant and electrolyzed to acquire $Ca(OH)_2$ as per the following equation:

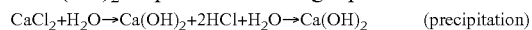

$CaCl_2+H_2O \rightarrow Ca(OH)_2+2HCl+H_2O \rightarrow Ca(OH)_2$ (precipitation)

In embodiments, after S7, additional steps of the following are included: S8: electrolyzing sodium chloride (NaCl) contained in disposed supernatant in S6 to produce sodium hydroxide (NaOH) as well as hydrogen chloride (HCl); and S9: adding carbon dioxide ($CO_2$) in sodium hydroxide (NaOH) obtained from S8 to produce sodium carbonate ($Na_2CO_3$).

Embodiments of the present invention make it possible to manufacture refined magnesium carbonate ($MgCO_3$) and calcium carbonate ($CaCO_3$), as well as sodium carbonate successively by adding a large quantity of carbon dioxide in sea water. Because these carbonates are manufactured with sufficient refinement, they can be utilized as resources.

Also, because it is possible to add a large quantity of carbon dioxide in sea water to manufacture carbonate successively (continuously), it effectively reduces carbon dioxide emission in the air significantly.

BRIEF DESCRIPTION OF THE DRAWINGS

These and other features of this invention will be more readily understood from the following detailed description of the various aspects of the invention taken in conjunction with the accompanying drawings in which:

FIG. 7 depicts carbonate produced through conventional methods of capturing carbon dioxide with microscopic image and EDS graph.

DETAILED DESCRIPTION

Figure 1A:
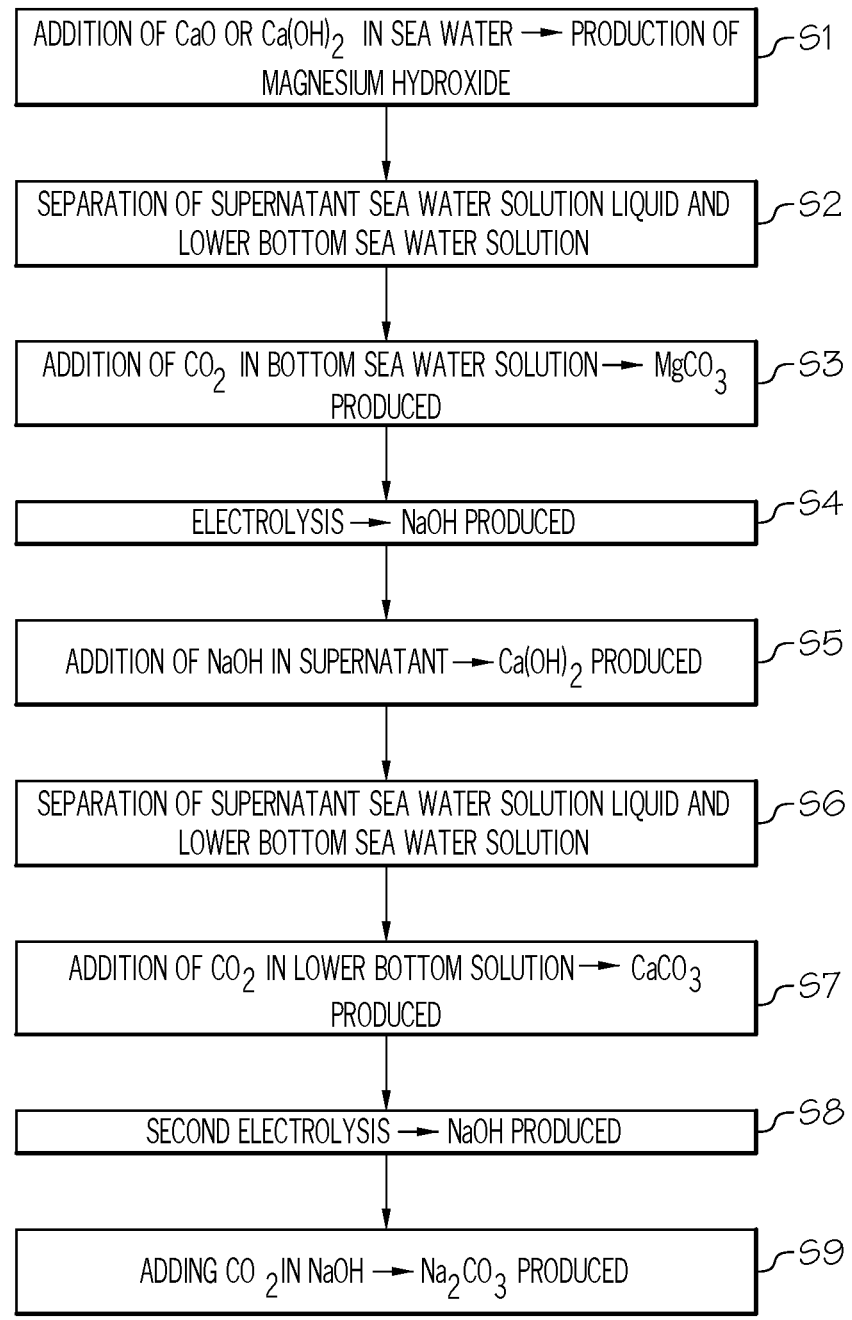
FIG. 1A is a flowchart of manufacturing carbonate in accordance with embodiments of the present invention.
Figure 1B:
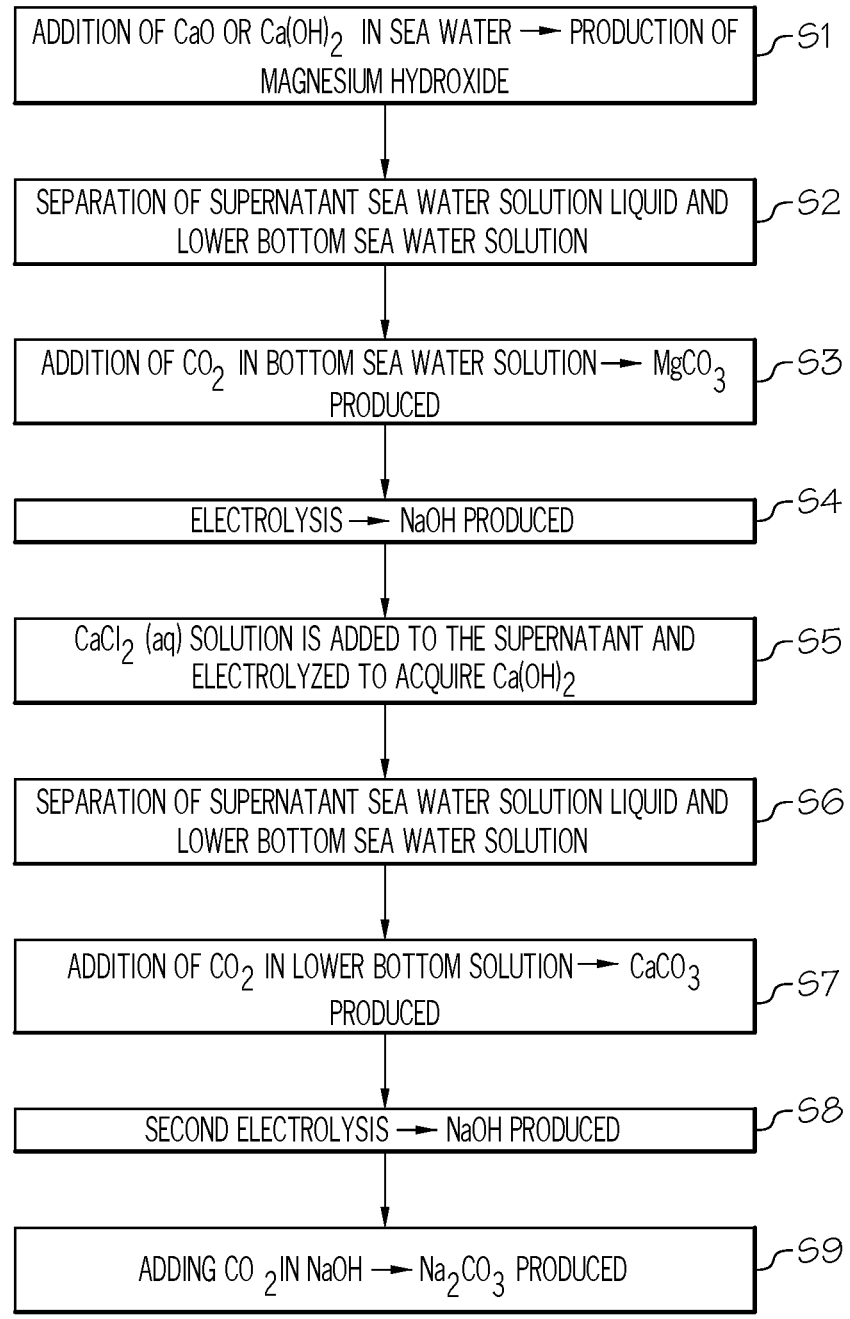
FIG. 1B is a flowchart of manufacturing carbonate in accordance with alternative embodiments of the present invention.
Figure 2:
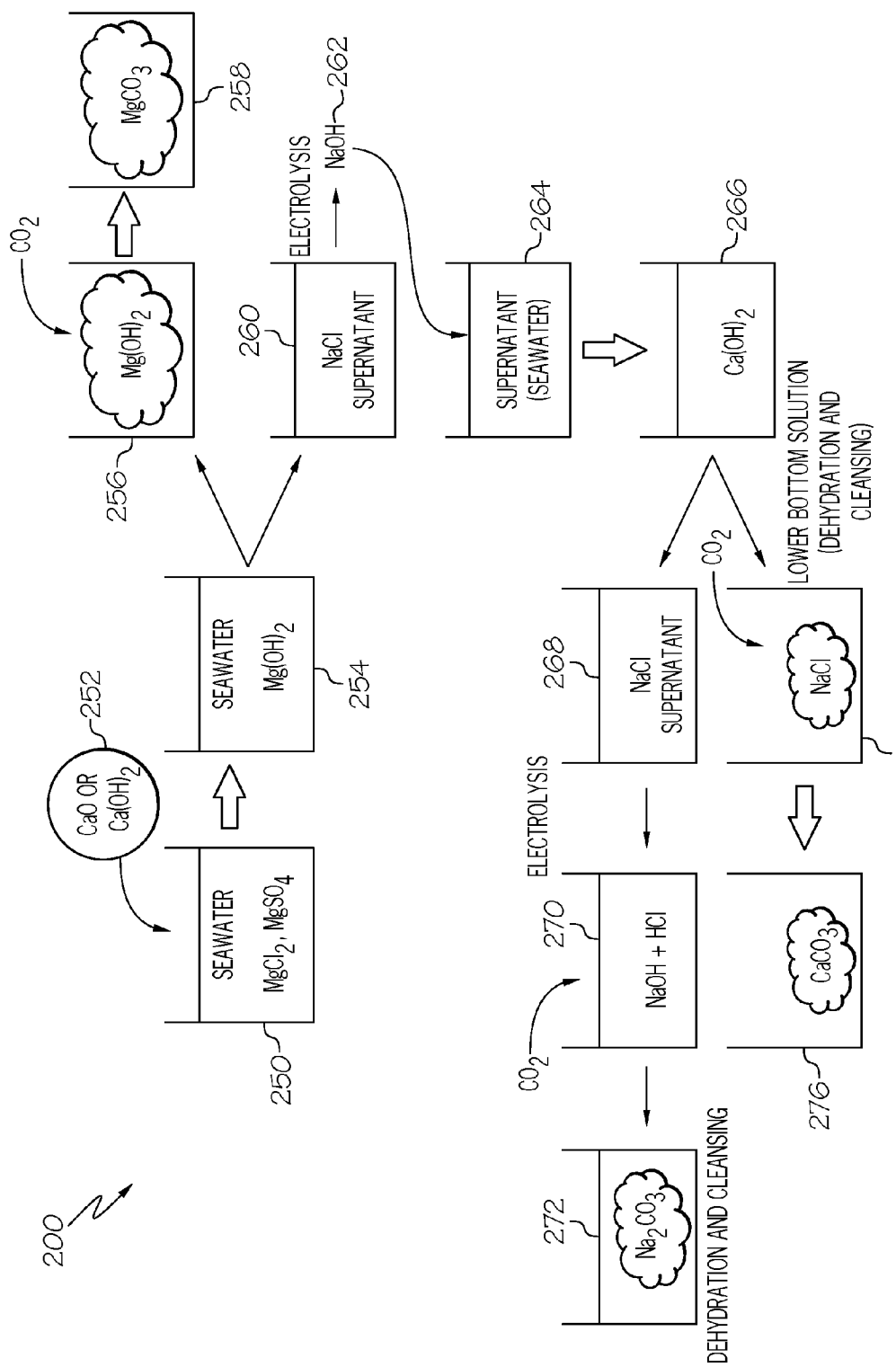
FIG. 2 is a block diagram of a process as illustrated in FIG. 1.

Referring to FIGS. 1A, 1B, and 2, embodiments of the present invention feature the following steps (indicated by "S" followed by a number, e.g., S1 is step 1):

S1: manufacturing magnesium hydroxide ($Mg(OH)_2$) by adding calcium oxide (CaO) or calcium hydroxide ($Ca(OH)_2$) in seawater solution;

S2: getting rid of supernatant in such seawater solution and separating lower portion liquid where magnesium hydroxide ($Mg(OH)_2$) is contained;

S3: adding carbon dioxide ($CO_2$) in such lower portion liquid where magnesium hydroxide ($Mg(OH)_2$) is contained to produce magnesium carbonate ($MgCO_3$);

S4: electrolyzing sodium chloride (NaCl) contained in supernatant disposed in S2 to produce sodium hydroxide (NaOH) as well as hydrogen chloride (HCl);

S5: adding sodium hydroxide (NaOH) obtained from S4 in disposed supernatant from S2 to produce calcium hydroxide ($Ca(OH)_2$). In an alternative embodiment, for step S5, a $CaCl_2$ (aq) solution is added to the supernatant and electrolyzed to acquire $Ca(OH)_2$ as per the following equation:

$$CaCl_2 + H_2O \rightarrow Ca(OH)_2 + 2HCl + H_2O \rightarrow Ca(OH)_2 \text{ (precipitation)}$$

S6: disposing supernatant from S5 and separating lower portion liquid including calcium hydroxide ($Ca(OH)_2$);

S7: adding carbon dioxide ($CO_2$) in such lower portion liquid in S6 to produce calcium carbonate ($CaCO_3$);

S8: electrolyzing sodium chloride (NaCl) contained in disposed supernatant in S6 to produce sodium hydroxide (NaOH) as well as hydrogen chloride (HCl);

S9: adding carbon dioxide ($CO_2$) in sodium hydroxide (NaOH) obtained from S8 to produce sodium carbonate ($Na_2CO_3$);

A more detailed description of the aforementioned steps of embodiments of the present invention is as follows:

Sea water contains salts such as NaCl, $MgCl_2$, $MgSO_4$, $CaSO_4$, and $K_2SO_4$. Table 1 shows exemplary amounts of each salt in 1000 kg of sea water.

TABLE 1

| Property | (%) | Kg |
|---|---|---|
| NaCl | 77.7 | 27.195 |
| $MgCl_2$ | 10.9 | 3.815 |
| $MgSO_4$ | 4.7 | 1.645 |
| $CaSO_4$ | 3.6 | 1.260 |
| $K2SO_4$ | 2.5 | 0.875 |
| Misc | 0.6 | 0.210 |
| $H_2O$ | | 965.000 |

Figure 3:
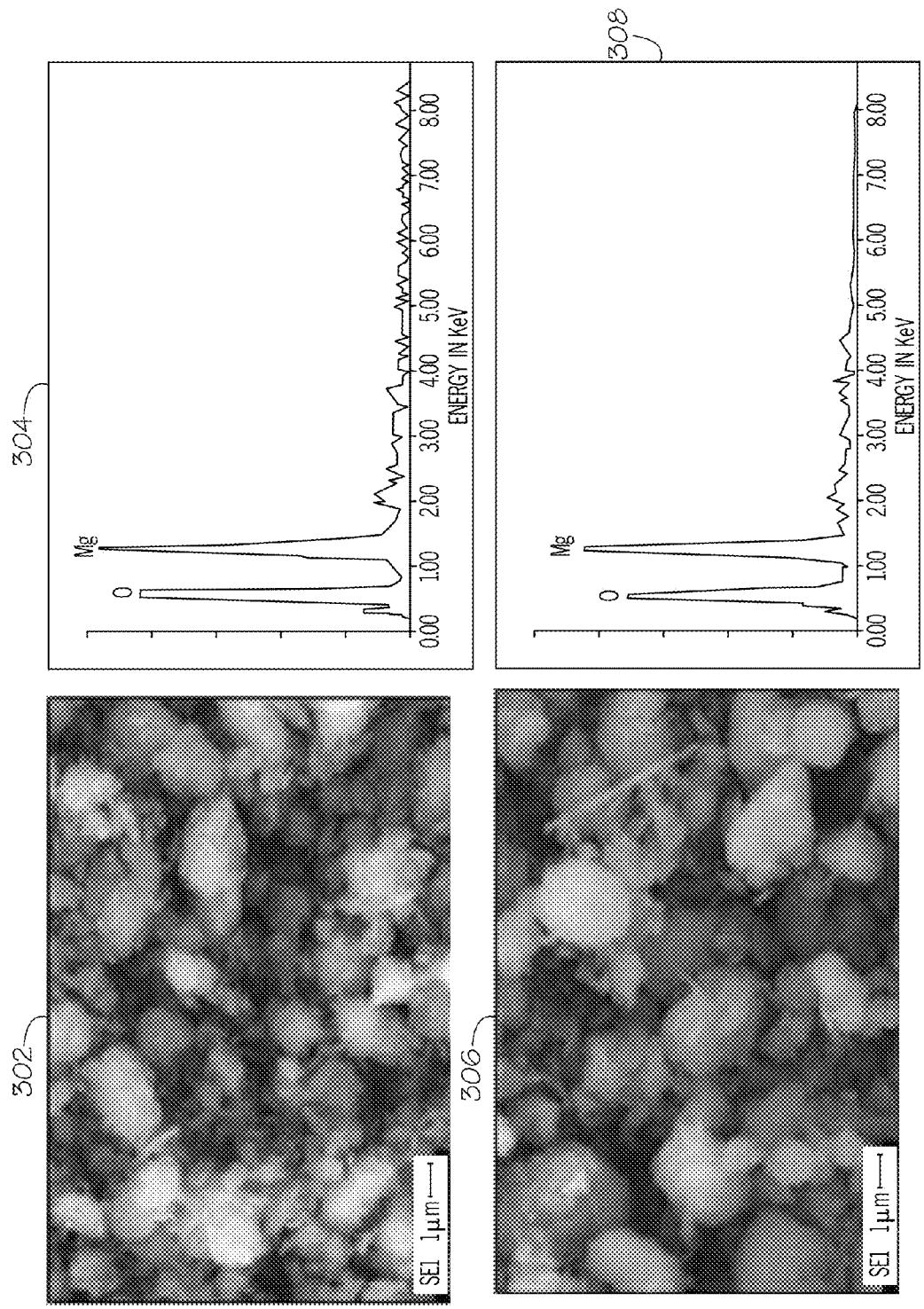
FIG. 3 depicts magnesium hydroxide ($Mg(OH)_2$) produced as a part of a carbonate manufacturing process with microscopic image as well as Energy Dispersive X-ray Spectroscopy (EDS) graph.

When adding calcium oxide (CaO) (quick lime) or calcium hydroxide ($Ca(OH)_2$) (slaked lime) in such sea water solution containing these salts, magnesium chloride ($MgCl_2$) as well as magnesium sulfate ($MgSO_4$) react with calcium oxide or calcium hydroxide (reference reaction formula 1) and cause magnesium hydroxide ($Mg(OH)_2$) to precipitate, as shown in FIG. 3 (S1). At this time, it is preferable to let the reaction occur for 30 minutes to 10 hours at room temperature (e.g., about 20 degrees Celsius to about 22 degrees Celsius) and that calcium oxide (CaO) amount (100% purity basis) fall below 0.31 weight % of sea water solution, such as a range between 0.29 weight percent and 0.31 weight percent, and, more ideally, it is 0.3013 weight %. If calcium oxide amount goes over 0.31 weight %, it can lead to a flaw where impurities form, and therefore refined carbonate cannot be obtained as a result.

Reaction formula 1 for magnesium hydroxide is shown below:

$$MgCl_2(aq) + CaO + H_2O \rightarrow Mg(OH)_2 + CaCl_2(aq)$$

Subsequently, after going through a "dehydration" process of emitting supernatant in such sea water solution, such magnesium hydroxide ($Mg(OH)_2$) separate and cleanse the precipitated lower portion liquid (S2)

Figure 4:
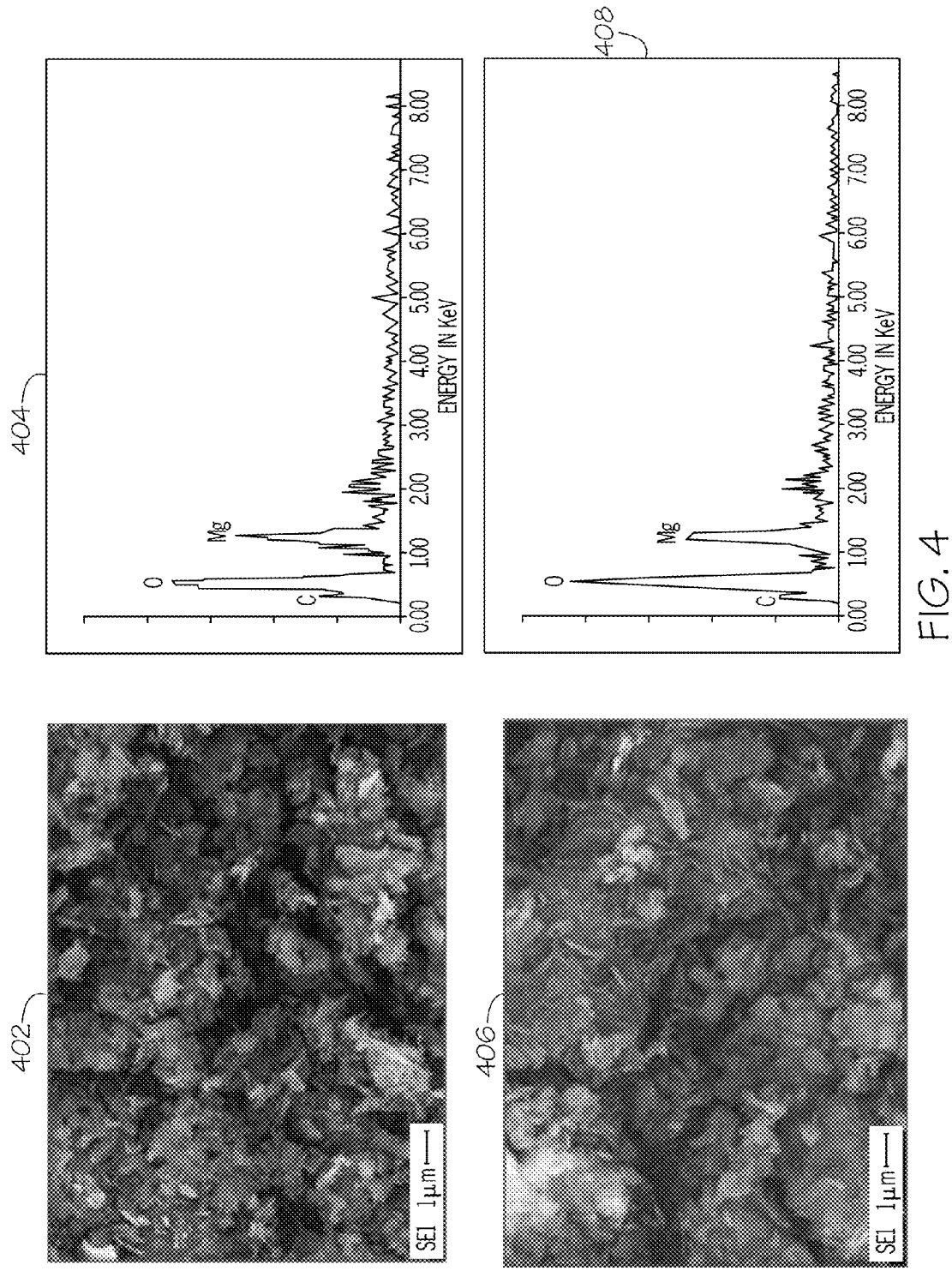
FIG. 4 depicts magnesium carbonate produced as a part of a carbonate manufacturing process with microscopic image as well as EDS graph.

When such magnesium hydroxide ($Mg(OH)_2$) adds carbon dioxide ($CO_2$) in precipitated liquid, magnesium carbonate ($MgCO_3$) becomes precipitated according to the following reaction formula: 2 (S3). If precipitated magnesium carbonate ($MgCO_3$) is separated from this solution and cleansed, it becomes utilizable refined magnesium carbonate ($MgCO_3$). At this time, magnesium hydroxide's ($Mg(OH)_2$) concentration is 5~40%, temperature is 10-90 C, and after 2~5 hours of reaction, it goes through a filtering and drying process. At this stage, carbon dioxide ($CO_2$) consumption amounts to 2.365 g per 1 kg of sea water solution. FIG. 4 is the microscopic view of refined magnesium carbonate ($MgCO_3$) produced in S3.

The reaction formula 2 for magnesium carbonate is shown below:

$$Mg(OH)_2(s) + CO_2(g) + H_2O(l) \rightarrow MgCO_3(s) + 2H_2O(l)$$

Subsequently, sodium chloride contained in such separated supernatant is electrolyzed to produce sodium hydroxide (NaOH) as well as hydrogen chloride (HCl) (reference reaction formula 3: S4).

The reaction formula 3 for sodium hydroxide is shown below:

$$2NaCl + 2H_2O \rightarrow 2NaOH + H_2 + Cl_2$$

If sodium hydroxide contained through such electrolysis is added to such supernatant, it reacts with sea water's calcium chloride ($CaCl_2$) as well as calcium sulfate ($CaSO_4$) (reference reaction formula 4) and cause calcium hydroxide ($Ca(OH)_2$) to precipitate (S5).

The reaction formula 4 for calcium hydroxide is shown below:

$$CaCl_2(aq) + 2NaOH(aq) \rightarrow Ca(OH)_2(s) + NaCl(aq)$$

$$CaSO_4(aq) + 2NaOH(aq) \rightarrow Ca(OH)_2(s) + Na_2SO_4(aq)$$

When calcium hydroxide ($Ca(OH)_2$) is precipitated, sea water solution's supernatant and lower portion liquid are again separated to form an upper portion liquid and a second lower portion liquid (S6).

Figure 5:
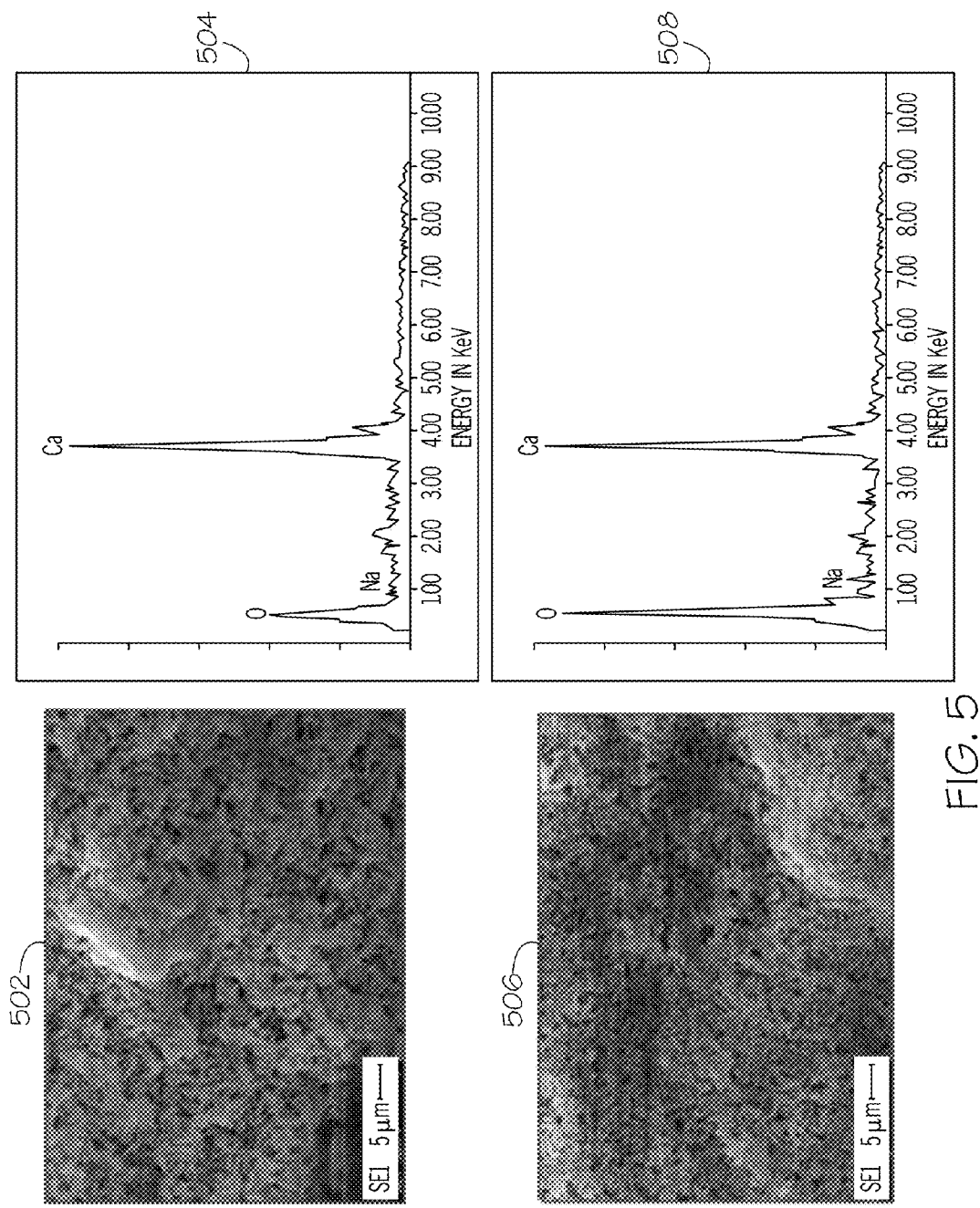
FIG. 5 depicts calcium carbonate ($CaCO_3$) produced as a part of a carbonate manufacturing process with microscopic image as well as EDS graph.

After dehydrating the lower portion liquid, calcium hydroxide ($Ca(OH)_2$) is cleansed and added with carbon dioxide ($CO_2$), which ultimately results in calcium carbonate ($CaCO_3$) to precipitate (S7). At this time, calcium hydroxide's ($Ca(OH)_2$) concentration is 5~40%, the process temperature is 10~90 C, and the reaction is maintained for 2~5 hours and the calcium carbonate is subsequently filtered and dried. At this stage, carbon dioxide ($CO_2$) consumption amounts to 2.365 g per 1 kg of sea water solution. FIG. 5 depicts microscopic images of refined calcium carbonate ($CaCO_3$) produced from S7.

The reaction formula 5 for calcium carbonate is shown below:

$$Ca(OH)_2(s) + CO_2(g) + H_2O(aq) \rightarrow CaCO_3(s) + 2H_2O(aq)$$

Successively, after dehydration and drying, utilizable refined calcium carbonate ($CaCO_3$) is obtained.

Subsequently, sodium chloride (NaCl) contained in supernatant separated in S6 is electrolyzed in order to produce sodium hydroxide (NaOH) as well as hydrogen chloride (HCl) (reference reaction formula 3: S8).

Figure 6:
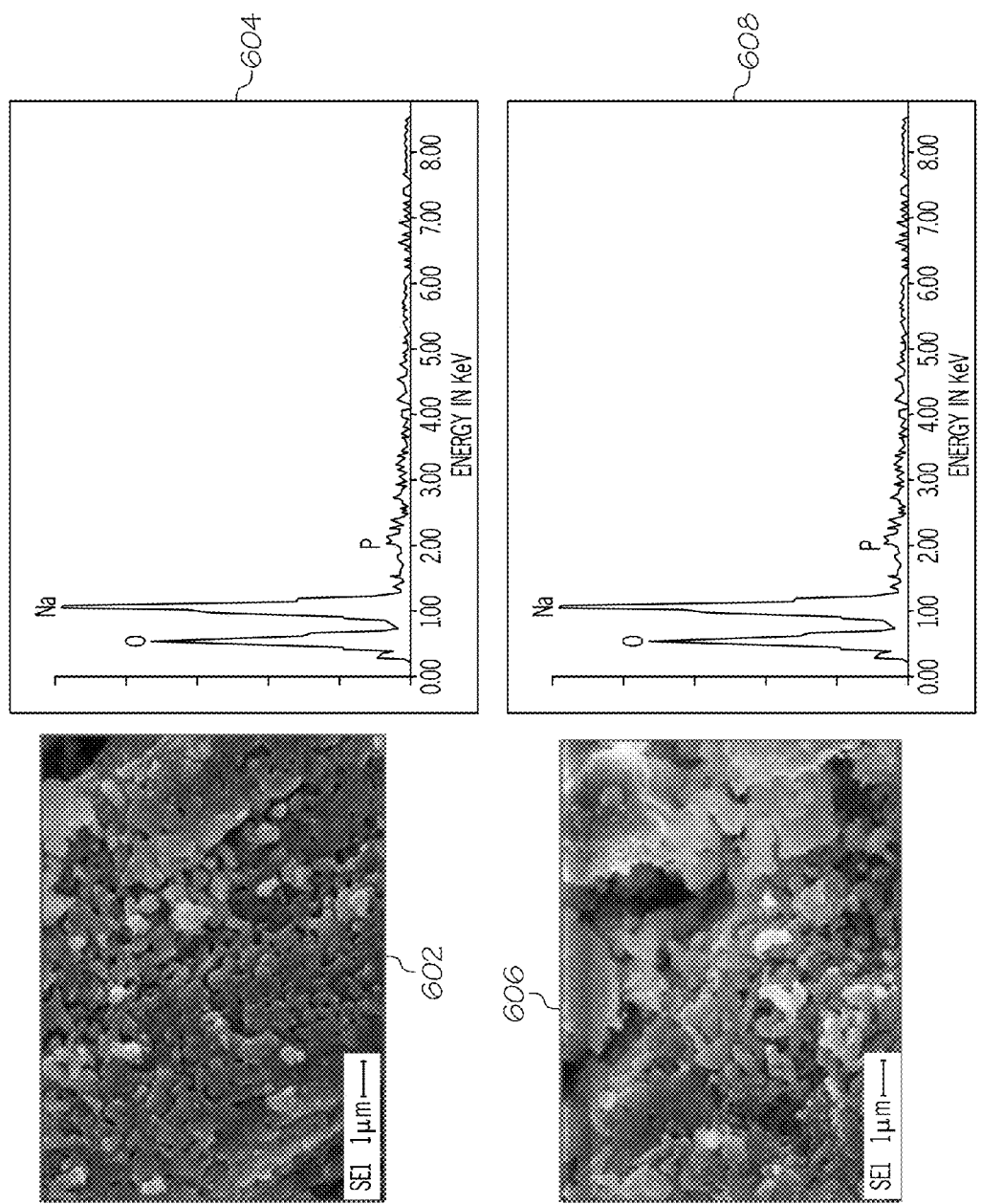
FIG. 6 depicts sodium carbonate ($Na_2CO_3$) produced as a part of a carbonate manufacturing process with microscopic image as well as EDS graph.

Furthermore, if carbon dioxide is added to such electrolyzed sodium hydroxide (NaOH), sodium carbonate ($Na_2CO_3$) is produced (S9) (reference FIG. 6). At this time, sodium hydroxide (NaOH) concentration is 3~50%, is at room temperature, and in embodiments, kept in reaction for 10 minutes~5 hours, and finally enriched as well as dried. At this stage, carbon dioxide consumption ($CO_2$) is 9.638 g per 1 kg of sea water solution.

The total carbon dioxide consumption while carrying out steps S1-S9 amounts to 14.368 kg per 1000 kg of sea water.

Table 2 shows carbonate produced according to embodiments of the present invention for manufacturing carbonate continuously and including carbon dioxide consumption; carbonate is produced by adding 3.013 kg of calcium oxide (CaO) per 1000 kg of sea water solution.

TABLE 2

|  | Substance | Amount (kg) |
| --- | --- | --- |
| Additive | CaO | 3.013 |
| Product & Remnant | $MgCO_3$ | 4.531 |
|  | $CaCO_3$ | 5.378 |
|  | $Na_2CO_3$ | 23.211 |
|  | $Na_2SO_4$ | 1.942 |
|  | $K_2SO_4$ | 0.875 |
|  | Misc | 0.006 |
|  | $H_2O$ | 957.183 |
| $CO_2$ consumption |  | 14.368 |

According to embodiments of the present invention, magnesium carbonate ($MgCO_3$), calcium carbonate ($CaCO_3$) and sodium carbonate ($Na_2CO_3$) are each produced in amounts of, 4.531 kg, 5.378 kg and 23.211 kg, respectively per sea water solution of 1000 kg. Also, 14.368 kg of carbon dioxide is consumed.

In addition, if magnesium carbonate ($MgCO_3$), calcium carbonate ($CaCO_3$), and sodium carbonate ($Na_2CO_3$) are manufactured successively, in accordance with embodiments of the present invention, refined versions of magnesium carbonate ($MgCO_3$), calcium carbonate ($CaCO_3$), and sodium carbonate ($Na_2CO_3$) are obtained, as shown in EDS graphs of either FIG. 3 or FIG. 6. For reference, EDS graphs are printed from an elemental analyzer (also called EDAX), Energy Dispersive X-ray Spectroscopy, and features X-ray energy where since every atom has a different value, they can be distinguished by X-ray energy. The graph is drawn with X-ray energy on X-axis and intensity (a,u) on the Y-axis and by calculating each peak area, relative quantitative methods of detected elements become possible.

Referring specifically to FIG. 2, showing a block diagram of processes in accordance with embodiments of the present invention, the process 200 starts with seawater 250, then in 252 adding CaO or $Ca(OH)_2$, then in 254 getting rid of supernatant in such seawater solution and separating the lower portion liquid where magnesium hydroxide ($Mg(OH)_2$) is contained, then in 256 adding carbon dioxide ($CO_2$) in such lower portion liquid where magnesium hydroxide ($Mg(OH)_2$) is contained, and then, in 258, producing magnesium carbonate ($MgCO_3$), and then in 260, electrolyzing sodium chloride (NaCl) contained in supernatant disposed in S2 to produce, in 262, sodium hydroxide (NaOH) as well as hydrogen chloride (HCl), and then in 264, adding sodium hydroxide (NaOH) obtained from S4 at 262 in disposed supernatant from S2 to then in 266, produce calcium hydroxide ($Ca(OH)_2$), and then in 268, disposing supernatant performing electrolysis on sodium chloride (NaCl) contained in disposed supernatant in S6 to, in 270, produce sodium hydroxide (NaOH) as well as hydrogen chloride (HCl), and then adding carbon dioxide ($CO_2$) in sodium hydroxide (NaOH) obtained from S8 to then in 272, produce sodium carbonate ($Na_2CO_3$). Now referring to lower portion 274, separating lower portion liquid including calcium hydroxide ($Ca(OH)_2$) of 266 to obtain precipitated (NaCl) and S7 adding carbon dioxide ($CO_2$) in such lower portion liquid in S6 to, in 276, produce calcium carbonate ($CaCO_3$). In embodiments, performing separations of solutions into a supernatant portion and a lower portion liquid may include use of a centrifuge. After applying the centrifuge, the lower portion liquid may contain particles of precipitate. Additionally, the separations disclosed herein may include, but are not limited to, the use of filtration and/or decanting.

FIG. 3 depicts magnesium hydroxide ($Mg(OH)_2$) produced as a part of a carbonate manufacturing process with microscopic images 302 and 306, as well as corresponding Energy Dispersive X-ray Spectroscopy (EDS) graphs 304 and 308. The graphs indicate the presence of oxygen and magnesium.

FIG. 4 depicts magnesium carbonate produced as a part of a carbonate manufacturing process with microscopic images 402 and 406, as well as corresponding EDS graphs 404 and 408. The graphs indicate the presence of carbon, oxygen, and magnesium.

FIG. 5 depicts calcium carbonate ($CaCO_3$) produced as a part of a carbonate manufacturing process with microscopic images 502 and 506, as well as corresponding EDS graphs 504 and 508. The graphs indicate the presence of oxygen, sodium, and calcium.

FIG. 6 depicts sodium carbonate ($Na_2CO_3$) produced as a part of a carbonate manufacturing process with microscopic images 602 and 606, as well as corresponding EDS graphs 604 and 608. The graphs indicate the presence of oxygen, sodium, and phosphorous.

FIG. 7 depicts carbonate produced through conventional methods of capturing carbon dioxide with microscopic image 702 and EDS graph 704.

In contrast to embodiments of the present invention, if manufacturing carbonate by simply adding carbon dioxide to sea water solution as in prior art methods, one can see, as shown in EDS graph of FIG. 7, that along with the magnesium carbonate ($MgCO_3$), calcium carbonate ($CaCO_3$) and sodium carbonate ($Na_2CO_3$) that are produced, there are also various impurities, making it impossible to obtain refined carbonate.

This phenomenon is confirmed by XRD (X-ray Diffraction) property analysis and graphs. For reference, XRD is a technique with a main goal of judging crystal structure by measuring the refracted angle of X-rays surveyed on a sample. Depending on crystal structure as well as substance, absorption wavelength varies, and depending on such absorption wavelength, so does positional value ($\sin \Theta$).

Figure 8:
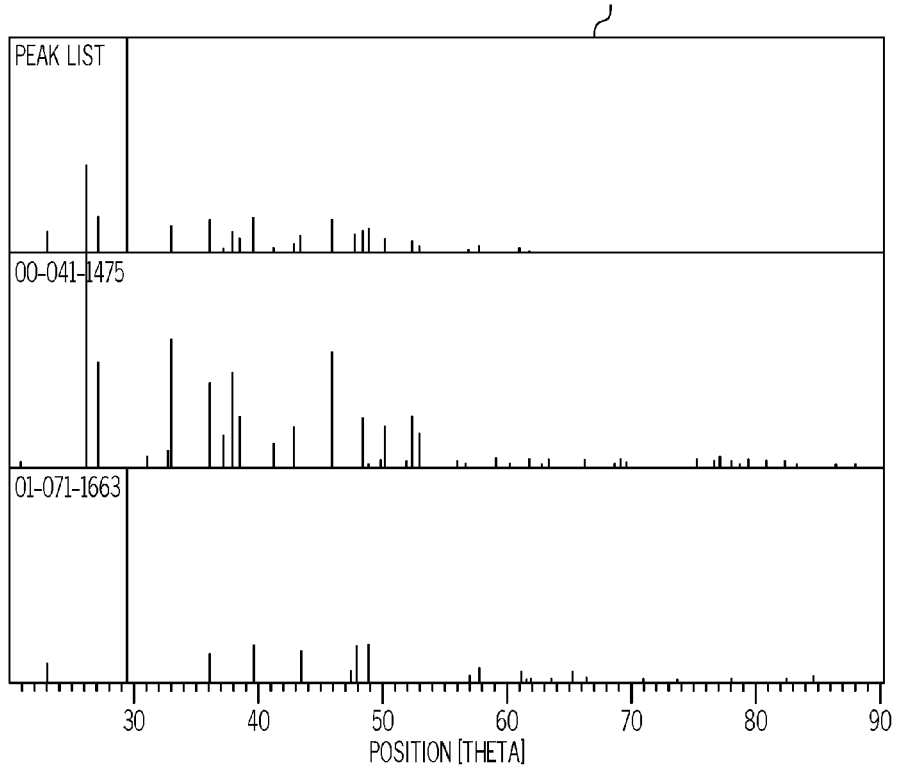
FIG. 8 is an XRD property analysis table as well as a graph of carbonate product through conventional carbon dioxide capturing method.

FIG. 8 is an XRD property analysis table 820 as well as a graph 822 of carbonate product through conventional carbon dioxide capturing methods. As depicted in FIG. 8, if manufacturing carbonate under conventional methods, it is confirmed that dolomite ($CaMg(CO_3)_2$) is produced with calcium carbonate ($CaCO_3$), along with other various impurities.

Figure 9:
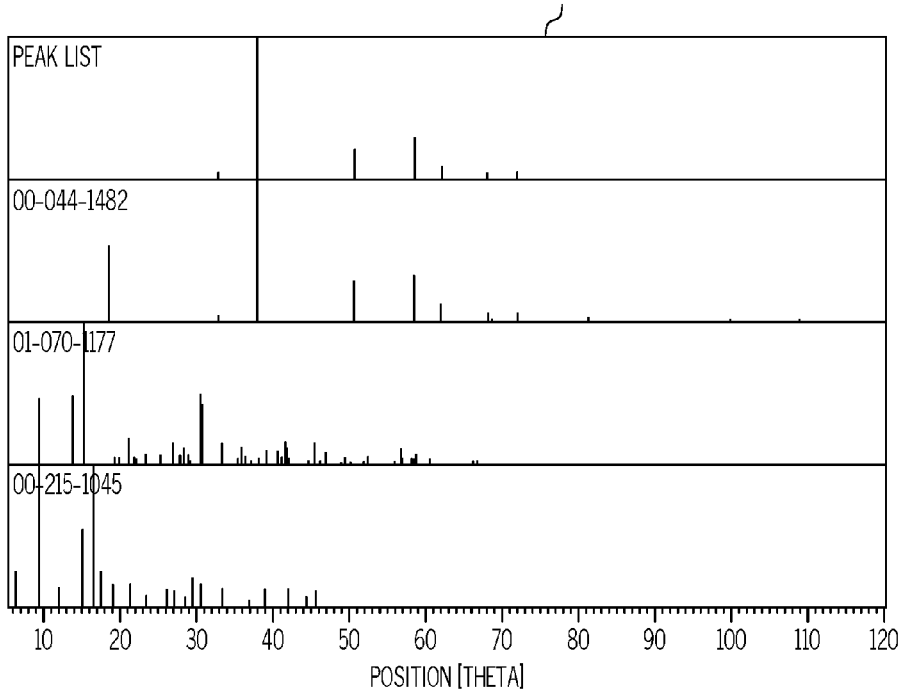
FIGS. 9 through 12 are XRD property analysis tables as well as graphs of products formed through each step (S2, S3, S7 and S9) through embodiments of the present invention.

On the other hand, FIGS. 9-12 show the XRD property analysis and graph of products obtained in S2, S3, S7 and S9, in accordance with embodiments of the present invention. FIG. 9 shows table 920 and graph 922 corresponding to the product obtained in S2, and indicate that it is mostly magnesium hydroxide ($Mg(OH)_2$).

Figure 10:
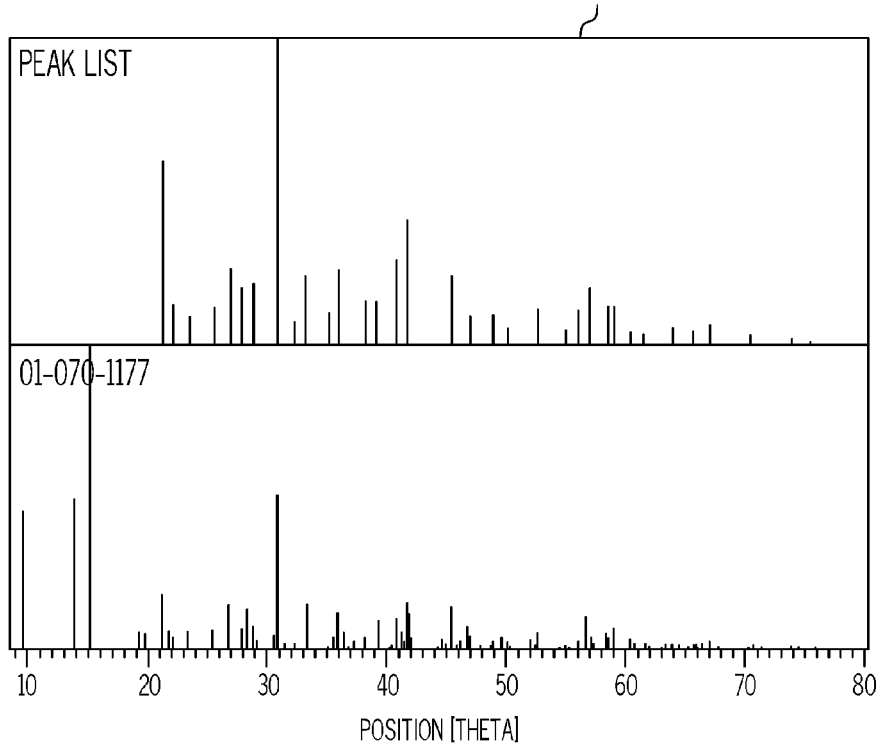

Referring to FIG. 10, table 1020 and graph 1022 corresponding to the product obtained in S3 are shown. From the information, it is confirmed that only magnesium carbonate ($MgCO_3$) is produced with very little to no impurities in S3.

Figure 11:
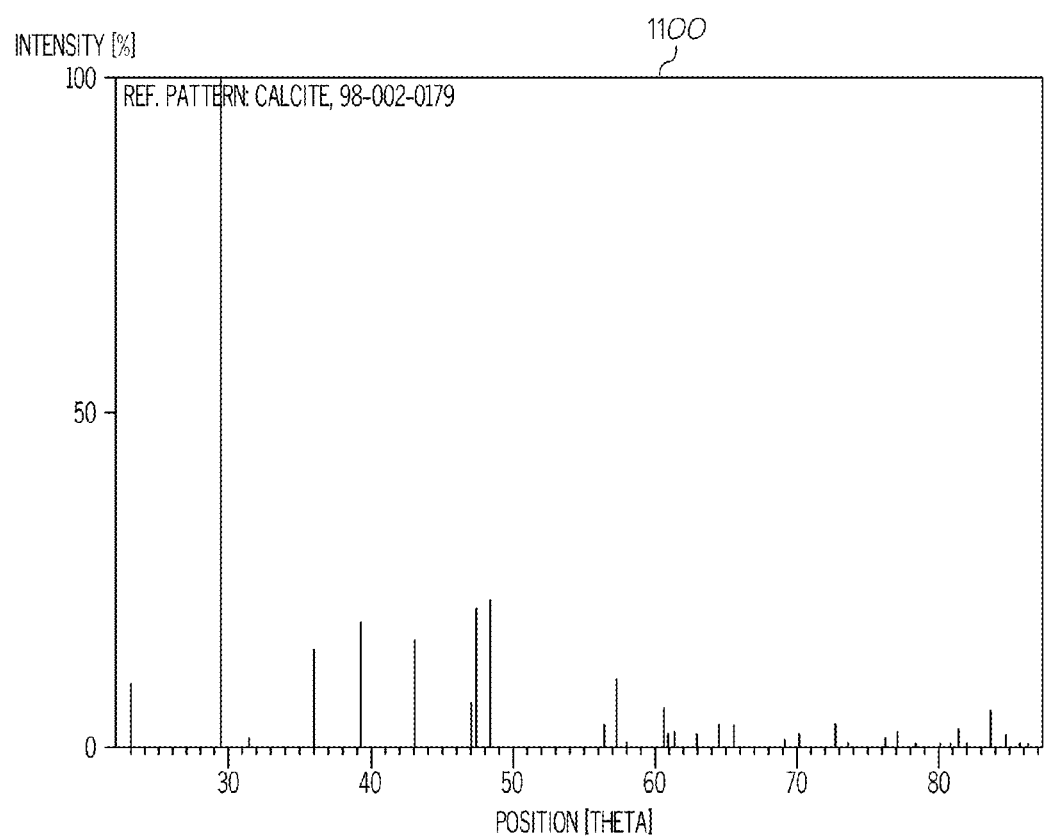

Referring to FIG. 11, table 1100 is shown, corresponding to the calcium carbonate of S7. It can be seen that the same applies to calcium carbonate ($CaCO_3$) in step S7 (that is, very little to no impurities).

Figure 12:
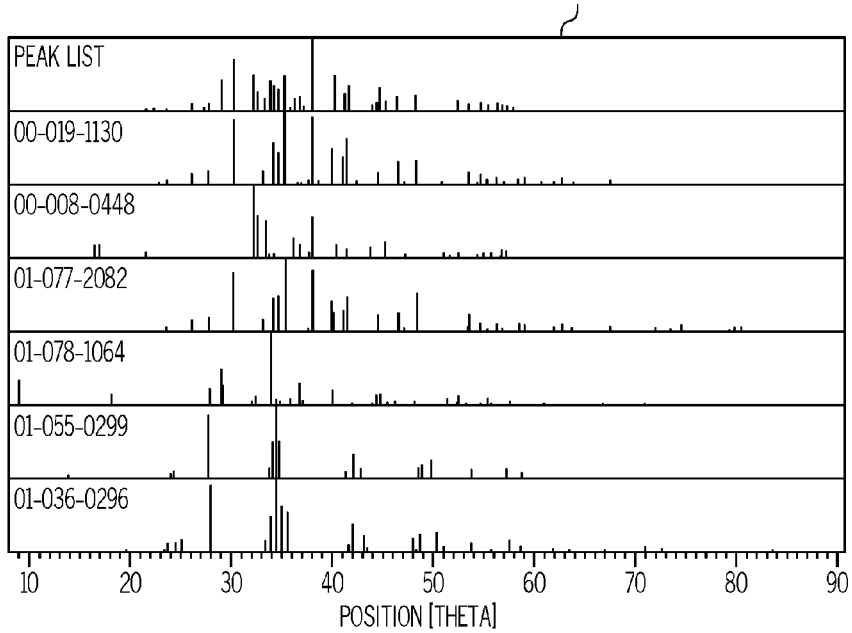

As depicted in FIG. 12, table 1220 and graph 1222, corresponding to the product obtained in S9, indicates that it is confirmed to be mostly sodium carbonate ($Na_2CO_3$).

As such, as per embodiments of the present invention, by adding carbon dioxide in sea water, only insignificant (trace) amounts of impurities are produced during successive (continuous) manufacturing of refined magnesium carbonate ($MgCO_3$) and calcium carbonate ($CaCO_3$), as well as sodium carbonate ($Na_2CO_3$), and because these substances are refined, they can be utilized.

On one hand, the aforementioned illustration describes that as a result of such manufacturing of calcium carbonate ($CaCO_3$) (S7), sodium carbonate ($Na_2CO_3$) is manufactured through electrolysis and carbon dioxide addition.

On the contrary, fresh water extraction such as reverse osmosis or ion exchange can be carried out against supernatant separated in S6 and separate water ($H_2O$) and sodium chloride (NaCl), in order to gain high purity salinity.

Embodiments of the present invention include the following steps:

S1: manufacturing magnesium hydroxide ($Mg(OH)_2$) by adding calcium oxide (CaO) or calcium hydroxide ($Ca(OH)_2$) in seawater solution;

S2: getting rid of supernatant in such seawater solution and separating lower portion liquid where magnesium hydroxide ($Mg(OH)_2$) is contained;

S3: adding carbon dioxide ($CO_2$) in such lower portion liquid where magnesium hydroxide ($Mg(OH)_2$) is contained to produce magnesium carbonate ($MgCO_3$);

S4: electrolyzing sodium chloride (NaCl) contained in supernatant disposed in S2 to produce sodium hydroxide (NaOH) as well as hydrogen chloride (HCl);

S5: adding sodium hydroxide (NaOH) obtained from S4 in disposed supernatant from S2 to produce calcium hydroxide ($Ca(OH)_2$);

In an alternative embodiment, for step S5, a $CaCl_2$ (aq) solution is added to the supernatant and electrolyzed to acquire $Ca(OH)_2$ as per the following equation:

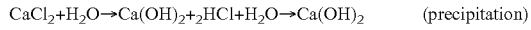

$$CaCl_2 + H_2O \rightarrow Ca(OH)_2 + 2HCl + H_2O \rightarrow Ca(OH)_2 \quad \text{(precipitation)}$$

S6: disposing supernatant from S5 and separating lower portion liquid including calcium hydroxide ($Ca(OH)_2$); and S7: adding carbon dioxide ($CO_2$) in such lower portion liquid in S6 to produce calcium carbonate ($CaCO_3$).

Embodiments of the present invention may further include the following additional steps to the above-mentioned steps: S8: electrolyzing sodium chloride (NaCl) contained in disposed supernatant in S6 to produce sodium hydroxide (NaOH), as well as hydrogen chloride (HCl); and S9: adding carbon dioxide ($CO_2$) in sodium hydroxide (NaOH) obtained from S8 to produce sodium carbonate ($Na_2CO_3$).

Embodiments of the present invention may further include an additional process of extracting sodium chloride (NaCl) from supernatant separated in S6 through fresh water extraction methods such as reverse osmosis or ion exchange, which is carried out subsequent to such step S7.

Embodiments of the present invention may further comprise such calcium oxide (CaO) amount added to sea water solution to be less than 0.31% of weight of sea water.

Embodiments of the present invention may further include manufacturing method features in the following steps: in S3, magnesium hydroxide's ($Mg(OH)_2$) concentration is 5~40%, temperature is 10-90 C, and after 2~5 hours of reaction, it goes through a filtering and drying process in order to produce magnesium carbonate ($MgCO_3$); in S7, calcium hydroxide's ($Ca(OH)_2$) concentration is 5~40%, temperature is 10~90 C, and reaction is kept for 2~5 hours and is then subsequently filtered and dried in order to produce calcium carbonate; in S9, sodium hydroxide (NaOH) concentration is 3~50%, is at room temperature, kept in reaction for 10 minutes~5 hours, and finally enriched as well as dried in order to produce sodium carbonate ($Na_2CO_3$).

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for manufacturing carbonate, comprising:
   adding calcium oxide (CaO) to sea water solution to produce magnesium hydroxide ($Mg(OH)_2$);
   performing a first separation of the sea water solution to a supernatant portion, and a lower portion liquid, wherein the lower portion liquid comprises magnesium hydroxide ($Mg(OH)_2$);
   producing magnesium carbonate by adding carbon dioxide ($CO_2$) to the lower portion liquid;
   electrolyzing the sodium chloride (NaCl) contained in the supernatant portion to produce sodium hydroxide (NaOH) and hydrogen chloride (HCl);
   adding sodium hydroxide (NaOH) obtained from the electrolyzing step into the supernatant portion to produce calcium hydroxide ($Ca(OH)_2$);
   performing a second separation of the supernatant portion to an upper portion liquid and a second lower portion liquid, the second lower portion liquid comprising calcium hydroxide ($Ca(OH)_2$); and
   adding carbon dioxide ($CO_2$) to the second lower portion liquid to produce calcium carbonate ($CaCO_3$).

2. The method of claim 1, further comprising electrolyzing sodium chloride (NaCl) contained in the upper portion liquid to produce sodium hydroxide (NaOH) and hydrogen chloride (HCl).

3. The method of claim 2, further comprising adding carbon dioxide ($CO_2$) to sodium hydroxide (NaOH) obtained from the upper portion liquid to produce sodium carbonate ($Na_2CO_3$).

4. The method of claim 2, wherein the sodium hydroxide (NaOH) concentration in the upper portion liquid ranges from 3 weight percent to 50 weight percent.

5. The method of claim 1, further comprising extracting sodium chloride (NaCl) from the upper portion liquid.

6. The method of claim 5, wherein the extracting of sodium chloride is performed by reverse osmosis.

7. The method of claim 5, wherein the extracting of sodium chloride is performed by ion exchange.

8. The method of claim 1, wherein adding calcium oxide (CaO) to the sea water solution comprises adding calcium oxide to bring a concentration of calcium oxide within the sea water solution to between 0.29 weight percent and 0.31 weight percent.

9. The method of claim 1, wherein producing magnesium carbonate comprises using a process temperature ranging from 10 degrees Celsius to 90 degrees Celsius.

10. The method of claim 9, wherein producing magnesium carbonate comprises using a reaction time ranging from about two hours to about five hours.

11. A method for manufacturing carbonate, comprising:
adding calcium hydroxide ($Ca(OH)_2$) to sea water solution to produce magnesium hydroxide ($Mg(OH)_2$);
performing a first separation of the sea water solution to a supernatant portion, and a lower portion liquid, wherein the lower portion liquid comprises magnesium hydroxide ($Mg(OH)_2$);
producing magnesium carbonate by adding carbon dioxide ($CO_2$) to the lower portion liquid;
electrolyzing the sodium chloride (NaCl) contained in the supernatant portion to produce sodium hydroxide (NaOH) and hydrogen chloride (HCl);
adding calcium chloride ($CaCl_2$) to the supernatant portion and electrolyzing the $CaCl_2$ to produce calcium hydroxide ($Ca(OH)_2$);
performing a second separation of the supernatant portion to an upper portion liquid and a second lower portion liquid, the second lower portion liquid comprising calcium hydroxide ($Ca(OH)_2$); and
adding carbon dioxide ($CO_2$) to the second lower portion liquid to produce calcium carbonate ($CaCO_3$).

12. The method of claim 11, further comprising electrolyzing sodium chloride (NaCl) contained in the upper portion liquid to produce sodium hydroxide (NaOH) and hydrogen chloride (HCl).

13. The method of claim 12, further comprising adding carbon dioxide ($CO_2$) to sodium hydroxide (NaOH) obtained from the upper portion liquid to produce sodium carbonate ($Na_2CO_3$).

14. The method of claim 12, wherein the sodium hydroxide (NaOH) concentration in the upper portion liquid ranges from 3 weight percent to 50 weight percent.

15. The method of claim 11, further comprising extracting sodium chloride (NaCl) from the upper portion liquid.

16. The method of claim 15, wherein the extracting of sodium chloride is performed by reverse osmosis.

17. The method of claim 15, wherein the extracting of sodium chloride is performed by ion exchange.

18. The method of claim 11, wherein producing magnesium carbonate comprises using a process temperature ranging from 10 degrees Celsius to 90 degrees Celsius.

19. The method of claim 18, wherein producing magnesium carbonate comprises using a reaction time ranging from about two hours to about five hours.

20. A method for manufacturing carbonate, comprising:
adding calcium oxide (CaO) to sea water solution to produce magnesium hydroxide ($Mg(OH)_2$);
performing a first separation of the sea water solution to a supernatant portion, and a lower portion liquid, wherein the lower portion liquid comprises magnesium hydroxide ($Mg(OH)_2$);
producing magnesium carbonate by adding carbon dioxide ($CO_2$) to the lower portion liquid;
electrolyzing the sodium chloride (NaCl) contained in the supernatant portion to produce sodium hydroxide (NaOH) and hydrogen chloride (HCl);
adding sodium hydroxide (NaOH) obtained from the electrolyzing step into the supernatant portion to produce calcium hydroxide ($Ca(OH)_2$);
performing a second separation of the supernatant portion to an upper portion liquid and a second lower portion liquid, the second lower portion liquid comprising calcium hydroxide ($Ca(OH)_2$);
adding carbon dioxide ($CO_2$) to the second lower portion liquid in S6 to produce calcium carbonate ($CaCO_3$); and
adding carbon dioxide ($CO_2$) to sodium hydroxide (NaOH) obtained from the upper portion liquid to produce sodium carbonate ($Na_2CO_3$), wherein the upper portion liquid is maintained at room temperature, and with a reaction time ranging from ten minutes to five hours.

* * * * *